United States Patent [19]
Kubo

[11] Patent Number: 4,771,632
[45] Date of Patent: Sep. 20, 1988

[54] SELF-CLEANING ARRANGEMENT FOR AUTOMOTIVE HOT WIRE TYPE AIR FLOW METER

[75] Inventor: Hiromasa Kubo, Yokohama, Japan

[73] Assignee: Nissan Motor Co., Ltd., Japan

[21] Appl. No.: 22,081

[22] Filed: Mar. 5, 1987

[30] Foreign Application Priority Data

Mar. 25, 1986 [JP] Japan ............................ 61-43299[U]

[51] Int. Cl.$^4$ ................................................ G01F 1/68
[52] U.S. Cl. .................................................. 73/118.2
[58] Field of Search ..................... 73/118.2, 118.1, 204

[56] References Cited

U.S. PATENT DOCUMENTS 4,334,186  6/1982  Sasayama et al. ..................... 73/204
4,373,383  2/1983  Plapp et al. ......................... 73/118.2
4,420,971 12/1983  Rapps et al. ......................... 73/204

FOREIGN PATENT DOCUMENTS 59-20813  2/1984  Japan .

Primary Examiner—Stewart J. Levy
Assistant Examiner—Robert R. Raevis

[57] ABSTRACT

A circuit monitors the resistance of a hot wire sensor element from the time a command to stop the engine is issued and either heats the wire to effect a self-cleaning function following a delay which is triggered by the resistance of the wire falling to a first predetermined level, or alternatively waits for the resistance to drop to a second level which is lower than the first and immediately induces heating.

7 Claims, 4 Drawing Sheets

SELF-CLEANING ARRANGEMENT FOR AUTOMOTIVE HOT WIRE TYPE AIR FLOW METER

BACKGROUND OF THE INVENTION

1. Field of the Invention

The present invention relates generally to a hot wire type air flow meter for use in an automotive internal combustion engine and more specifically to such a device which includes an efficient self-cleaning arrangement which is capable of self-timing its operation.

2. Description of the Prior Art

FIGS. 1 and 2 show a prior art arrangement disclosed in Japanese Patent Application First Provisional Publication No. 59-20813 published on Feb. 2, 1984. This arrangement has attempted to endow a hot wire type air flow meter 1 with self-cleaning characteristics by arranging for a current to be passed through the sensing element (hot wire) 2 of the air flow meter each time the engine 3 is stopped. The object of this arrangement is to vaporize fuel and the like which tends to accumulate thereon. Viz., when the engine 3 is stopped, as the engine is still hot, the fuel which inevitably wets the walls of the induction system downstream of the point at which fuel is supplied thereinto by a fuel injector 4, evaporates and tends to pass back around an engine throttle valve 5 and subsequently condenses at locations upstream thereof. This, in combination with the fine dust and the like which tends to enter the induction system despite the provision of an air cleaner 6, tends to cause thermally insulating deposits to accumulate on the sensor element (hot wire) and thus reduce the accuracy of the device.

In order to promote effective cleaning the circuitry 7 which is associated with the hot wire sensor element includes a timer arrangement which delays the supply of electrical energy to the wire for a predetermined time t (see FIG. 2) after the ignition switch is opened.

However, depending on the mode of engine operation immediately prior the driver turning the ignition key to a position which will stop the operation of the engine, the time required for the air in the induction system in the vicinity of the flow sensor to assume a zero velocity and for the fuel vapor to disperse and/or condense, can be as long as 4 seconds.

During cleaning operation, if the wire is excessively cooled by movement of air and/or the presence of fuel vapor it tends to be insufficiently cleaned. On the other hand, if the movement of the air stops very quickly then the possibility of it being overheated in a manner which reduces the longevity thereof exists.

Thus, this arrangement has suffered from the drawback that it is very difficult to suitably select the fixed delay in view of the various variables involved in a manner which promotes the required cleaning efficiency and which avoids the risk of unduly reducing the life of the sensor.

SUMMARY OF THE INVENTION

It is an object of the present invention to provide a hot wire type air flow meter which includes an arrangement which monitors a parameter which varies with the cooling effect of the air and the like in the induction system on the sensor element and which supplies electrical current at a time which optimizes the effect thereof and protects the sensor element from being detrimentally overheated.

In brief, the above object is achieved by an arrangement featuring a circuit which monitors the resistance of the sensor element and which either heats the wire following a delay which is triggered upon the resistance of the wire falling to a first predetermined level, or alternatively waits for the resistance to drop to a second level which is lower than the first and immediately induces heating.

More specifically, a first aspect of the present invention comes in the form of an internal combustion engine having an induction system and an air flow sensor comprising: a sensing element, the sensing element taking the form of a wire which is arranged in the induction system so as to be exposed to the flow of air passing therethrough; a circuit for heating the wire to a predetermined temperature during operation of the engine and for selectively heating the wire for a predetermined period of time following the engine operation being stopped; and means for sensing a parameter which varies with the resistance of the wire and which triggers the heating for the predetermined period of time in response to the resistance of the wire having fallen to a predetermined level.

A second aspect of the present invention comes in the form of a method of operating a hot wire air-flow meter which is characterized by the steps of: sensing the engine being stopped; monitoring a parameter which varies with the resistance of the hot wire sensing element of the air-flow meter; heating the hot wire sensing element for a predetermined period in response to the step of monitoring indicating that the resistance of the hot wire sensing element has fallen to a predetermined level.

DETAILED DESCRIPTION OF THE PREFERRED EMBODIMENTS

Figure 1:
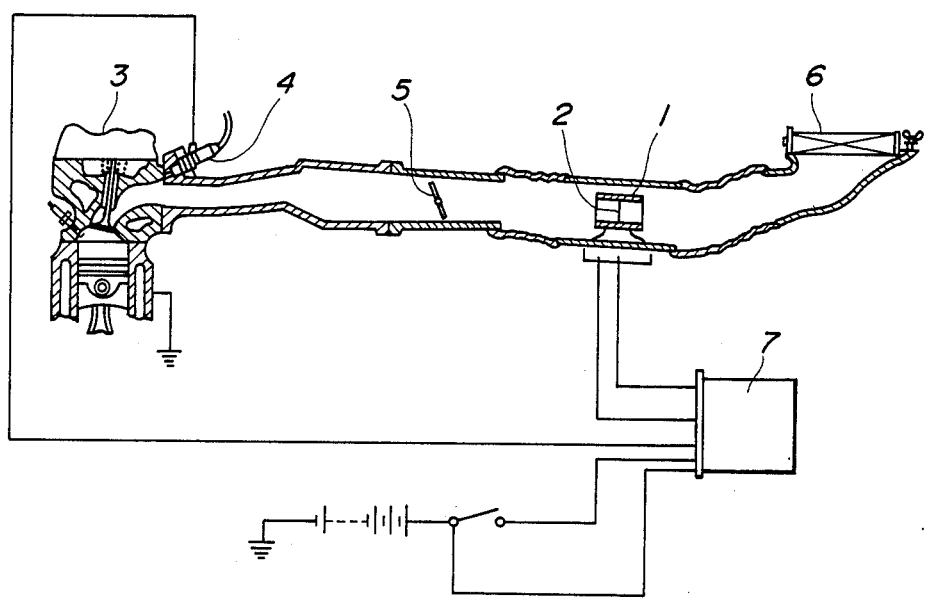
FIGS. 1 and 2 show the prior art arrangement discussed in the opening paragraphs of the instant disclosure.
Figure 2:
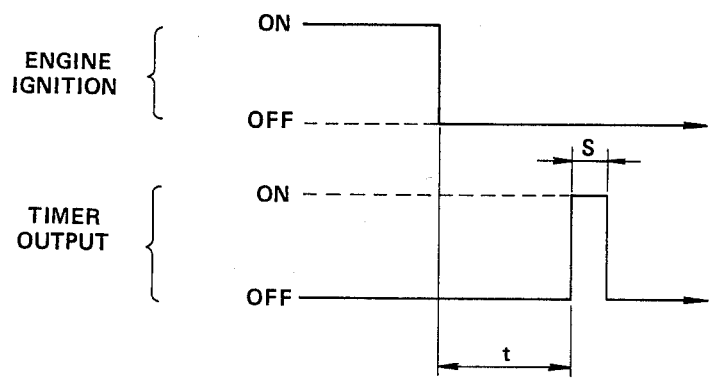
Figure 3:
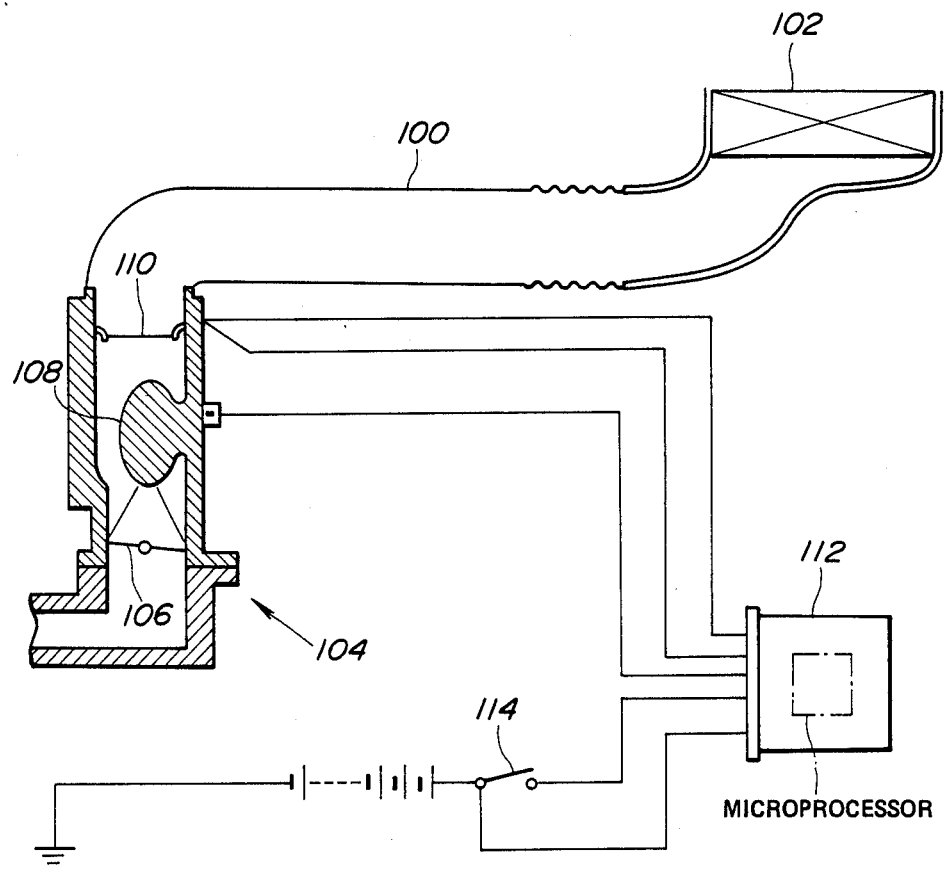
FIG. 3 is a schematic elevation partially in section showing an engine induction system equipped with an embodiment of the present invention.

FIG. 3 shows a induction arrangement to which the embodiments of the present invention are applied. In this arrangement an air induction conduit 100 interconnects an air cleaner element 102 with an engine manifold arrangement generally denoted by the numeral 104. As shown, the manifold arrangement includes a butterfly type throttle valve 106 which is disposed downstream of a single point fuel injector 108. As will be readily appreciated it is possible to replace the SPI arrangement with a suitable carburettor or the like or alternatively use a plurality of direct or indirect fuel injectors.

In this arrangement the hot wire sensor element (platinum) 110 of the air flow meter is located upstream of the air-fuel mixture forming device and in relatively close proximity to the engine throttle valve 106. The SPI injector 108 and the sensor element 110 are connected to a control circuit 112. This circuit includes circuitry which controls the temperature of the sensor element or "hot wire" 110 as it will be referred to hereinafter, to a predetermined constant level during engine operation.

The control circuit is also connected with the engine ignition switch 114 in a manner as schematically illustrated.

Figure 4:
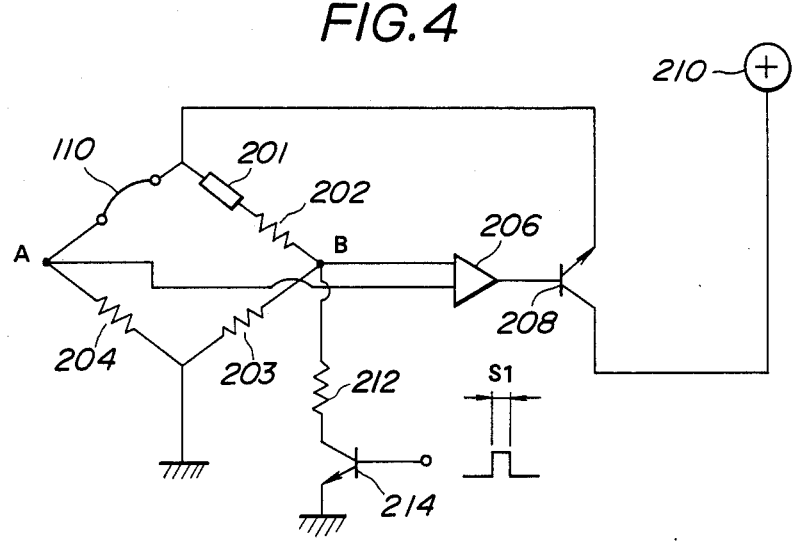
FIG. 4 is a circuit diagram showing a Wheatstone bridge circuit utilized in the embodiments of the present invention.

The temperature control circuitry of the control circuit 112 basically takes the form of a Wheatstone Bridge which is arranged as schematically shown in FIG. 4. This arrangement includes a temperature correction resistor 201 and three fixed resistances 202–204.

A comparator 206 is connected to terminals A and B of the illustrated circuit in a manner that when a difference in potential occurs therebetween due a slight cooling of the hot wire 110 and a corresponding reduction in resistance thereof, the comparator 206 applies an input to the base of a transistor 208. When this transistor 208 is rendered conductive by an output from the comparator 206 current is supplied from a source of EMF 210 to the junction defined between the hot wire 110 and the temperature responsive resistor 201. The application of current immediately restores the temperature of the hot wire 110 to the desired level. By suitably tapping the potential developed at a selected point within the circuit it is possible to sense the amount of current passing through the hot wire 110 and therefore the amount of cooling. The amount of air being inducted is indicated by the current flow.

A resistor 212 and a transistor 214 are circuited in series between the terminal B and ground. The base of the transistor 214 is connected to an output port (not shown) of a microprocessor included in the control circuit 112. When transistor 214 is rendered conductive the grounding of terminal B induces the flow of current through the hot wire in a manner which tends to re-establish the bridge equilibrium.

Figure 5:
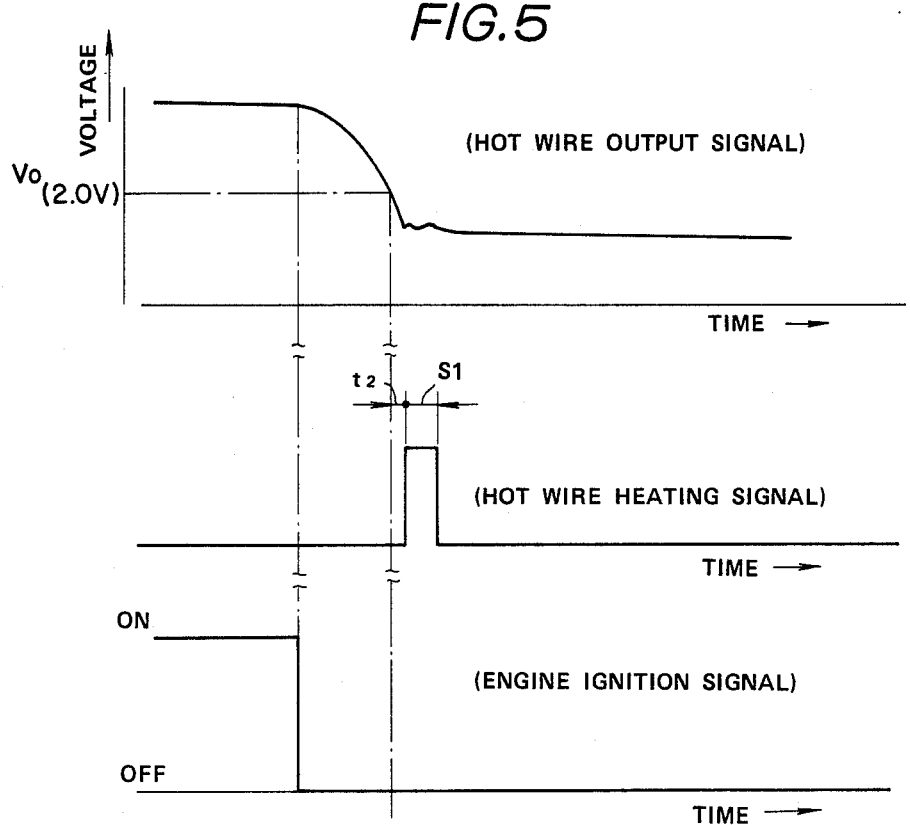
FIG. 5 is a timing chart showing the relationship between the resistance of the hot wire sensor element and the timing of the heating of the same.

FIG. 5 shows a timing chart which depicts the concept on which the present invention is based. Viz., following the ignition signal falling to a low level in response to the ignition key being rotated to a suitable position, the temperature and therefore the resistance of the hot wire begins to decline as shown in chart. In the first embodiment the resistance of the hot wire 110 is monitored and upon the value thereof falling to a predetermined level which in this case is selected to be approximately 2.0 volt, a delay of t2 seconds is triggered. When this period expires a signal is applied to the base of transistor 214 for a predetermined period of time (S1 seconds) whereafter the system is shut down.

Figure 6:
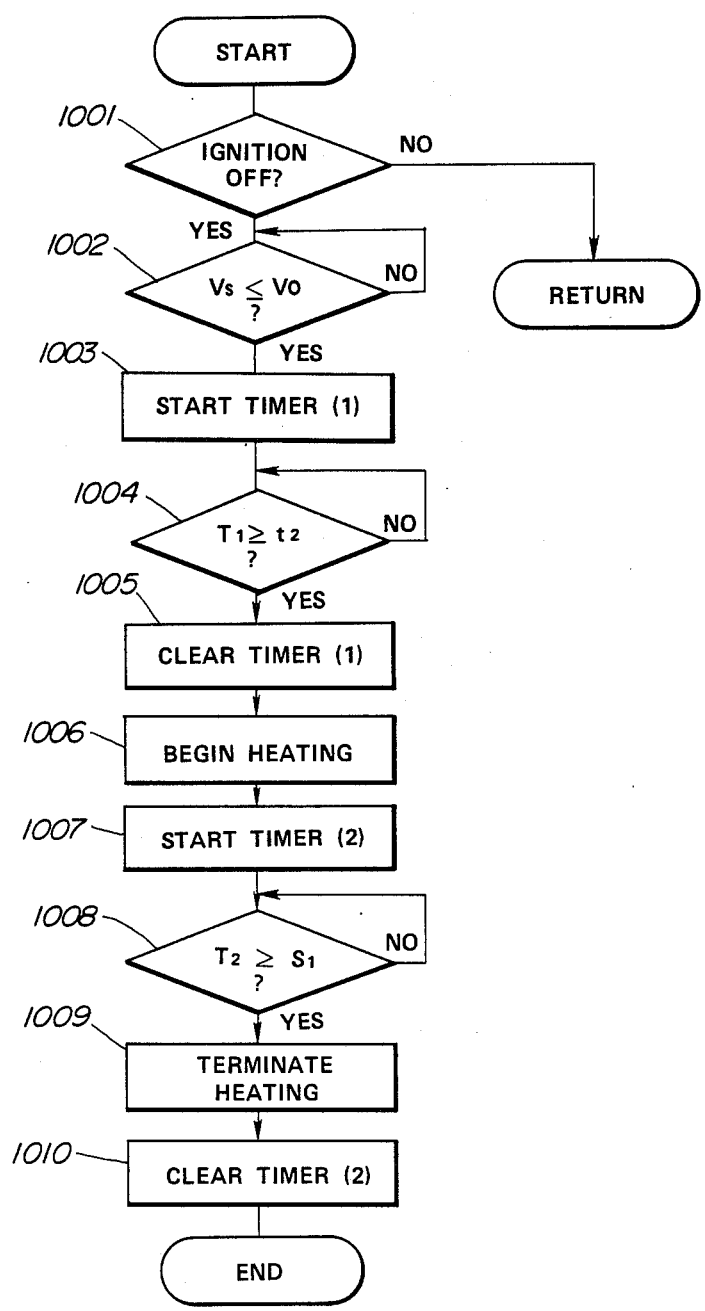
FIG. 6 is a flow chart showing the steps which are conducted in a microprocessor included in the air-flow sensor system and which characterize a first embodiment of the present invention.

FIG. 6 shows in flow chart form the steps which characterize a control program stored in the ROM of the microprocessor and which is used to control the signal applied to the base of transistor. This program can be of the type which is run at predetermined frequent intervals e.g. every 10 ms. Alternatively, the program can take the form of an interrupt routine which is run in response to a hard wire interrupt induced by the ignition signal (chart C in FIG. 5) falling to its low level. In this instance the first step of the flow chart described hereinunder can be omitted.

The first step (1001) of the control program is such as to determine if the ignition key is off or not. In the event that the key is in a position which induces engine operation the program returns. However, in the event that this inquiry detects that the ignition signal has dropped to a low level indicating that the engine is being stopped, the program flows to step 1002 wherein voltage Vs appearing on a selected terminal (herein shown as terminal A in FIG. 4) of the bridge circuit is sampled and compared with a predetermined value Vo. Upon the voltage Vs falling to or below Vo the program flows to step 1003 wherein a command to start a first timer (timer 1) is issued. As will be appreciated this timer can take the form of a soft clock (by way of example) which is arranged to count up a predetermined number of operations, pulses, clockpulses or the like.

Step 1004 samples the instant status of timer 1 and determines if the first period of time $t_2$ has elapsed or not. Upon the count reaching that indicative of time $t_2$ which in this embodiment is selected to be 0.6 sec, the program flows to step 1005 wherein timer 1 is cleared. At step 1006 a command to begin the heating of the hot wire 110 is issued. This command can induce a sub-routine which causes a high level signal to be generated at an output port and applied to the base of transistor 214.

At step 1007 a command to start a second timer (timer 2) is issued. Timer 2 is arranged to count up to a value which corresponds to a time S1. In this embodiment S1 is selected to be 0.3 sec. Upon the expiration of this period a command to terminate the heating of the hot wire 110 is issued and at step 1010 timer 2 is cleared in preparation for the next cleaning operation.

In a second embodiment of the present invention the delay is eliminated and the voltage value at which the heating is initiated is set at a second predetermined value which is selected to fall within the range of 0.5–0.6 volt by way of example. Viz., in the second embodiment the resistance of the hot wire 110 is monitored and upon falling to a given low value heating is immediately induced at a timing which is variable with the rapidity with which the wire 110 is cooled.

What is claimed is

1. In an internal combustion engine having an induction system:
    an air flow sensor comprising:
    a sensing element, said sensing element taking the form of a wire which is arranged in said induction system so as to be exposed to the flow of air passing therethrough;
    a circuit for heating said wire to a predetermined temperature during operation of the engine and for selectively heating said wire for a predetermined first period of time following the engine operation being stopped; and
    means for sensing a paramater which varies with the resistance of said wire and which triggers said circuit in a manner which induces the heating for said predetermined first period of time in response to the resistance of said wire having fallen to a predetermined level.

2. An air-flow sensor as claimed in claim 1 wherein said parameter sensing means responds to the resistance of said wire falling to said predetermined level and includes a circuit for delaying the heating of said wire for a predetermined second period after said predetermined level is reached.

3. An air-flow sensor as claimed in claim 1 wherein said engine includes a throttle valve and air-fuel mixture forming means, said throttle valve and air-fuel mixture forming means being disposed in said induction system at a location in close proximity and downstream of said wire of the air flow sensor.

4. An air flow sensor as claimed in claim 1, wherein said circuit takes the form of a bridge circuit comprising:
   first, second, third and fourth legs interconnected at junctions;
   said first leg including a first fixed resistor and a temperature correction element connected in series,
   said second and third legs including second and third fixed resistors, respectively, and
   said fourth leg including said hot wire as a variable resistor,
   first and second terminals defined at the junctions of said first and second and said third and fourth legs, respectively;
   a comparator connected with said first and second terminals, said compartor being connected with a supply of electrical energy in a manner that when a difference between the potential developed at said first and second terminals occurs electrical power is supplied to the junction defined between the first and fourth legs of said bridge circuit;
   said first terminal being selectively connectable with ground through a fourth fixed resistance in response to said parameter sensing means sensing indicating that the resistance of said wire has fallen to said predetermined level following the engine being stopped.

5. A method of operating a hot wire air-flow meter of an internal combustion engine comprising the steps of:
   sensing the engine being stopped;
   monitoring a parameter which varies with the resistance of a wire sensing element of the air-flow meter in the event that said sensing step indicates that the engine has stopped;
   heating said hot wire sensing element for a predetermined first period in response to the step of monitoring indicating that the resistance of said hot wire sensing element has fallen to or below a predetermined level.

6. A method as claimed in claim 5 further comprising the step of delaying the heating step for a predetermined second period after the rsistance of said hot wire sensing element has fallen to said predetermined level.

7. A method of operating a hot wire air-flow meter installed in an internal combustion engine comprising the steps of:
   sensing the engine being stopped;
   monitoring a parameter which varies with the resistance of a wire sensing element of the air-flow meter in the event that said sensing step indicates that the engine has stopped;
   heating said hot wire sensing element for a predetermined first period in response to the step of monitoring indicating that the resistance of said hot wire sensing element has fallen to or below a predetermined level.

* * * * *